Figure 1:
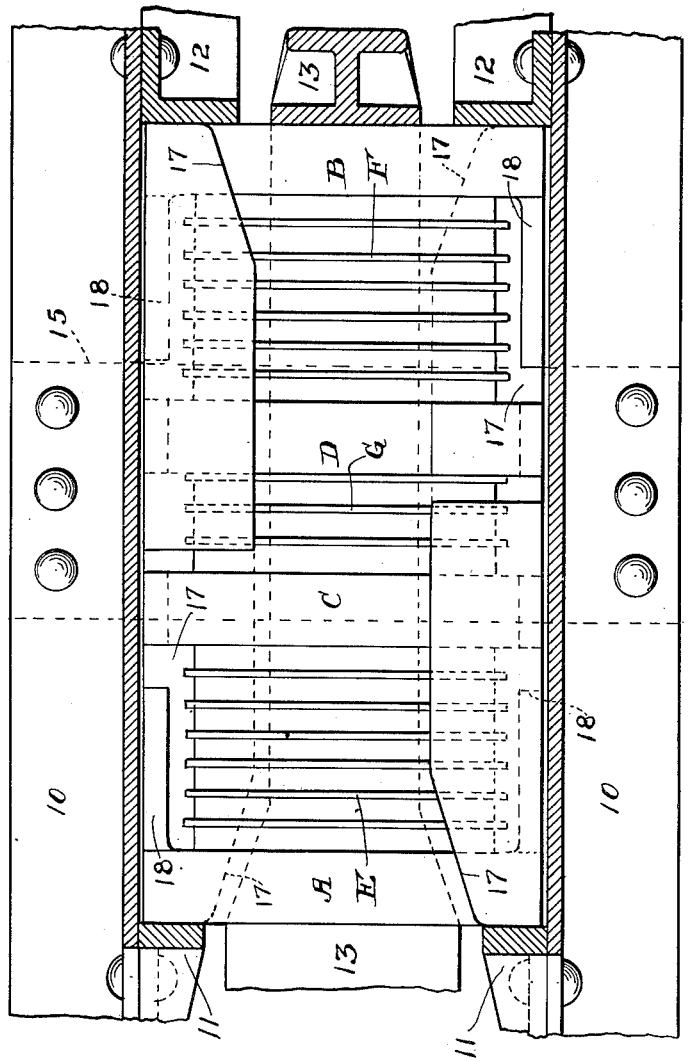

Sept. 1, 1953  V. S. DANIELSON  2,650,720
SHOCK ABSORBING MECHANISM FOR RAILWAY DRAFT RIGGINGS
Filed May 17, 1952  3 Sheets-Sheet 1

Inventor:
Vernon S. Danielson.
By Henry Fuchs
Atty.

Sept. 1, 1953 V. S. DANIELSON 2,650,720
SHOCK ABSORBING MECHANISM FOR RAILWAY DRAFT RIGGINGS
Filed May 17, 1952 3 Sheets-Sheet 3
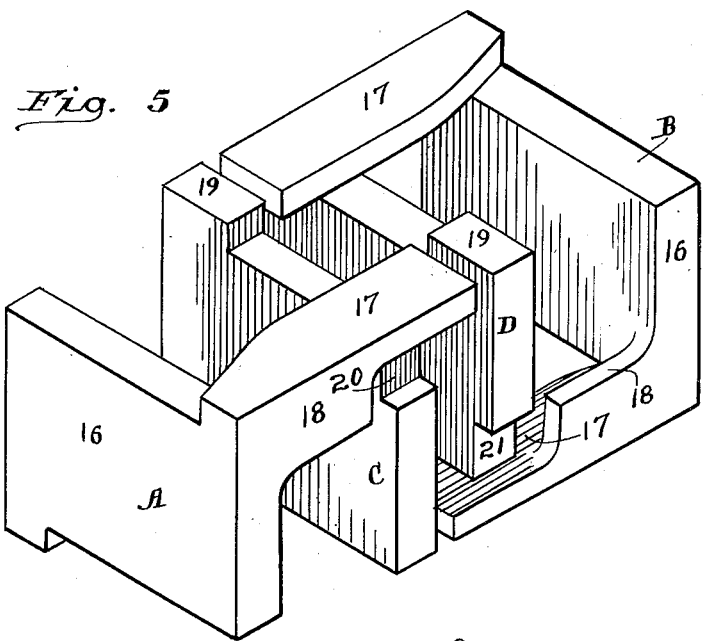
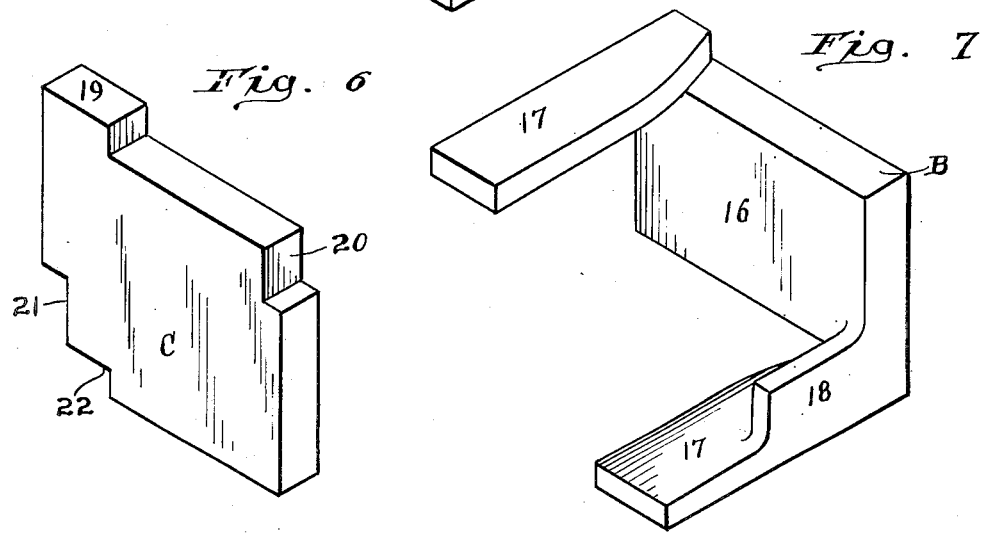
Inventor
Vernon S. Danielson.
By Henry Fuchs.
Atty.

Patented Sept. 1, 1953

2,650,720

UNITED STATES PATENT OFFICE 2,650,720

SHOCK ABSORBING MECHANISM FOR RAILWAY DRAFT RIGGINGS

Vernon S. Danielson, Chicago, Ill., assignor to W. H. Miner, Inc., Chicago, Ill., a corporation of Delaware Application May 17, 1952, Serial No. 288,399

11 Claims. (Cl. 213—45)

This invention relates to improvements in shock absorbing mechanisms, and more particularly to shock absorbing mechanisms employing a rubber cushioning means.

The main object of the invention is to provide a shock absorbing mechanism designed primarily for use in railway draft riggings having relatively soft initial action which is produced by yielding cushioning means embodied therein, comprising a plurality of cushioning elements, which are compressed in series during the first part of the compression stroke with resultant soft action and certain of said elements are compressed in parallel during further compression of the mechanism to absorb heavier shocks.

A further and more specific object of the invention is to provide a shock absorbing mechanism as set forth in the preceding paragraph, wherein at least one of the plurality of cushioning elements is unloaded during compression of the remaining cushioning elements in parallel, and is subjected to compression when the actuating force is reduced, to cushion the recoil of the elements which have been compressed in parallel.

A still further object of the invention is to provide a shock absorbing mechanism of the character hereinbefore set forth, wherein each of the cushioning elements is composed of a plurality of rubber units, each of which includes a rubber pad and a spacing member.

Yet another object of the invention is to provide a shock absorbing mechanism comprising front and rear end follower members, front and rear intermediate follower members, a cushioning element interposed between the front end follower member and the front intermediate follower member, a second cushioning element interposed between the front and rear intermediate follower members, and a third cushioning element interposed between the rear intermediate follower member and the rear end follower member, wherein the pressure is transmitted from the first named cushioning element to the third named cushioning element through the intermediate followers and the interposed second named cushioning element, during the first part of the compression stroke, thereby effecting compression of all of these cushioning elements in series to provide relatively soft cushioning action, and wherein the front and rear end follower members are provided with pressure transmitting means engageable respectively with said rear and front intermediate follower members after the mechanism has been compressed to a predetermined extent, to compress said first and third cushioning elements in parallel between said front end and front intermediate, and rear intermediate and rear end followers to provide high shock absorbing capacity during the last part of the compression stroke for absorbing heavier shocks, and at the same time effect unloading of said second named cushioning element by relative separation of said intermediate followers, whereby the shock absorbing capacity of said second named cushioning element is effective to cushion the recoil action of the first and third named cushioning elements when the actuating force is reduced.

Other objects of the invention will more clearly appear from the description and claims hereinafter following.

Figure 2:
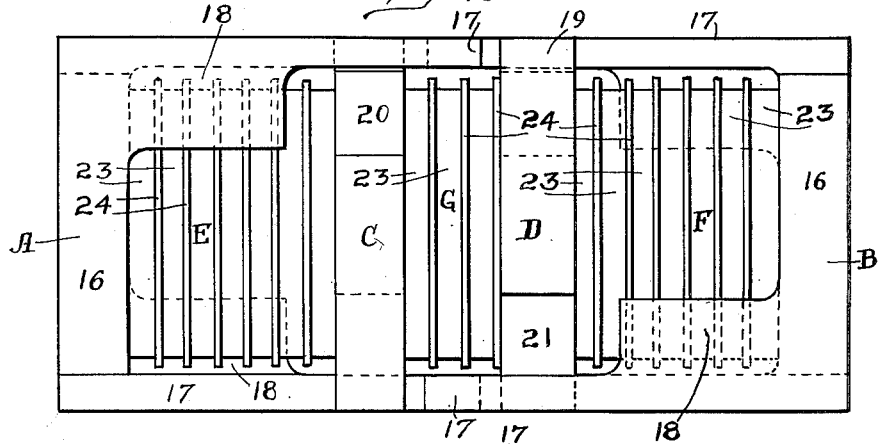
Figure 3:
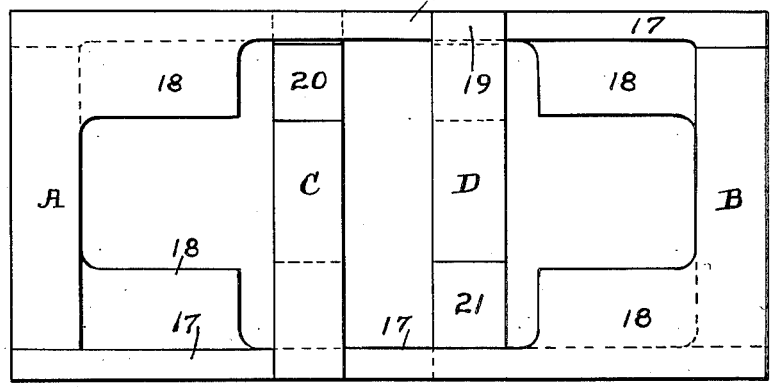
Figure 4:
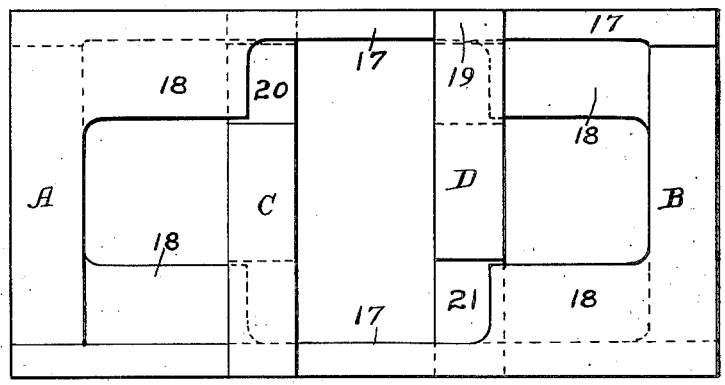

In the accompanying drawings forming a part of this specification, Figure 1 is a longitudinal sectional view of a portion of a railway draft rigging, showing my improved shock absorbing mechanism in connection therewith, a portion of the yoke of the draft rigging being shown in horizontal section. Figure 2 is a side elevational view of the shock absorbing mechanism illustrated in Figure 1. Figure 3 is a view similar to Figure 2 with the cushioning elements omitted and showing the mechanism partially compressed. Figure 4 is a view similar to Figure 3, showing the mechanism fully compressed. Figure 5 is a detail perspective view, on a reduced scale, of the improved shock absorbing mechanism with the cushioning elements omitted, the positions of the parts corresponding substantially to the positions shown in Figures 1 and 2. Figure 6 is a detail perspective view, on a reduced scale, of the rear intermediate follower of the mechanism. Figure 7 is a detail perspective view, on a reduced scale, of the rear end follower of said mechanism.

In said drawings, referring first to Figure 1, 10—10 indicate channel-shaped center or draft sills of a railway car underframe provided with the usual front and rear stop lugs 11—11 and 12—12. The yoke of the draft rigging is indicated by 13. The improved shock absorbing mechanism is disposed within the yoke. The yoke and the parts therewithin are supported in operative position by a detachable saddle plate 15.

Referring to the drawings, my improved shock absorbing mechanism proper comprises broadly a front end follower member A, a rear end follower member B, a front intermediate follower member C, a rear intermediate follower member D, a front cushioning element E, a rear cushioning element F, and an intermediate cushioning element G.

The front and rear end follower members A and B are preferably of identical design. Each follower member A—B, as shown, comprises a substantially rectangular plate 16 having a pair of arms 17—17 projecting therefrom, the arms of the follower member A projecting rearwardly and those of the follower member B projecting forwardly. The two arms 17—17 of each follower member are at diagonally opposite corners thereof. As shown, the front and rear follower members A and B are in respectively reversed positions, the top arms 17—17 of the follower members A and B being respectively at opposite sides of the mechanism, and the bottom arm 17 of each follower member A and B being at the side thereof opposite to the top arm 17. The arms 17—17 and 17—17 of the two follower members A and B are all of the same length and each arm 17 is provided with a right angular vertical guide flange 18 at its outer longitudinal edge, which flange terminates some distance inwardly from the outer end of said arm.

The front and rear intermediate follower members C and D are of like construction. Each of these intermediate follower members is in the form of a substantially rectangular plate, having an upstanding lug 19 at one side thereof and a notch 20 at the opposite side. At the bottom side of each follower member C and D, the same is notched or cut away, as indicated at 21, the notch 21 of said intermediate follower member being at the same side thereof as the lug 19. Adjacent the notch 21, the lower portion of each intermediate follower member is provided with a shallow notch 22. The two intermediate follower members C and D are in reverse positions in the assembled condition of the mechanism with the top lugs 19—19 of the follower members C and D disposed, respectively, on opposite sides of the mechanism.

In the assembled condition of the mechanism, the lug 19 of the front intermediate follower member C is in longitudinal alignment with the top arm 17 of the rear end follower member B and the lug 19 of the rear intermediate follower member D is in alignment with the top arm 17 of the front end follower member A, the notches 20 and 21 of the front intermediate follower member are in longitudinal alignment with the flanges 18—18 of the top and bottom arms of the front end follower member A, the notch 22 being in alignment with the lower arm 17 of said front end follower member, the notches 20 and 21 of the rear intermediate follower member C are in alignment with the flanges 18—18 of the top and bottom arms 17—17 of the rear end follower member B and the notch 22 thereof is in alignment with the lower arm 17 of said rear end follower member. As will be evident, the flanges 18—18 of the arm 17—17 of each end follower member are thus accommodated and guided in the notches 20 and 21 of the adjacent intermediate follower member when the mechanism is being compressed, and the bottom arm 17 of each of said front and rear end follower members is accommodated in the notch 22 of the adjacent intermediate follower member, thus slidably supporting said intermediate follower member.

The cushioning elements E, F, and G are each composed of a plurality of cushioning units of well-known design, each unit of which comprises the usual rubber pad 23 and a metal spacing member 24. The cushioning elements E and F are identical, each being composed of a plurality of units 23—24, preferably seven, as shown, arranged in series. The element E is interposed between the front end and rear intermediate follower members and thus forms the front outer cushioning element of the mechanism, the cushioning element F is interposed between the end follower member B and the rear intermediate follower member D and thus forms the outer rear cushioning element of the mechanism.

The cushioning element G is shown as of smaller size than the elements E and F, being preferably composed of three units 23—24. The element G is interposed between the intermediate follower members C and D, thus forming the intermediate cushioning unit of the mechanism.

In the assembled condition of the mechanism, ready for service on the railway car, all of the cushioning elements E, F, and G are under initial compression with the rear ends of the arms 17—17 of the front end follower member A spaced from the rear intermediate follower member D, and the front ends of the arms 17 of the rear end follower member B spaced from the front intermediate follower member C, as illustrated in Figures 1, 2, and 5.

The operation of my improved shock absorbing mechanism is as follows: Upon a draft or buffing force being applied to the shock absorbing mechanism, the end follower members A and B are forced toward each other, thereby compressing the front cushioning element E between the front end and front intermediate follower members A and C, the rear element F between the rear end follower member B and rear intermediate follower member D, and the intermediate element G between the intermediate follower members C and D. During this part of the compression stroke of the mechanism, the cushioning elements E, F, and G are compressed in series, thus providing relatively soft action, which takes care of the lighter shocks. This soft cushioning action continues until the parts reach the positions shown in Figure 3, whereupon the arms 17—17 and 17—17 of the front and rear end followers come into engagement with the rear and front intermediate followers, respectively, thus moving the rear intermediate follower in unison with the front end follower member toward the rear end follower member and moving the front intermediate follower member C in unison with the rear end follower member B toward the front end follower member A, thereby separating the intermediate follower members and compressing the front and rear cushioning elements E and F in parallel to provide high shock absorbing capacity while at the same time unloading the intermediate cushioning element G. This action continues until the end of the compression stroke of the mechanism, as illustrated in Figure 4. When the actuating force is reduced, the elements E and F expand, returning the parts to the positions shown in Figures 1 and 2. During return movement of the parts, the cushioning element G is compressed between the intermediate follower members C and D, thereby cushioning the recoil action of the elements E and F.

I claim:

1. In a shock absorbing mechanism, the combination with a set of more than two cushioning elements; of means for compressing all of said elements of said set in series; and means cooperating with said first named means operative after compression to a predetermined extent of said elements in series by said first named means for compressing two of said elements of said set in parallel and removing the load from the remaining element.

2. In a shock absorbing mechanism, the combination with a pair of front and rear cushioning elements; of an intermediate cushioning element; means for compressing all of said element in series; and means cooperating with said first named means operative after compression to a predetermined extent of all of said elements in series for compressing said front and rear elements in parallel and reducing the load on said intermediate element.

3. In a shock absorbing mechanism, the combination with a pair of front and rear end follower members; of a pair of front and rear intermediate follower members; front and rear cushioning elements interposed between said front end and front intermediate follower members, and said rear end and rear intermediate follower members; an intermediate cushioning element interposed between said intermediate follower members; and solid column means operative after a predetermined compression of the mechanism to transmit the pressure from said front end follower member to said rear intermediate follower member and from said rear end follower member to said front intermediate follower member to move said intermediate follower members apart.

4. In a shock absorbing mechanism, the combination with two longitudinally aligned end followers movable lengthwise of the mechanism toward and away from each other; of a set of three longitudinally aligned cushioning elements between said end followers; a follower between each cushioning element and the next adjacent cushioning element; and pressure transmitting solid column means between each end follower and the second follower therebeyond and having lost motion with respect to said last named follower during part of the compression stroke of the mechanism to permit compression of all of said elements in series between said end followers, and engageable during the remainder of the compression stroke with said follower with respect to which it has lost motion to effect parallel compression of two of said elements and unloading of said third element.

5. In a shock absorbing mechanism, the combination with two longitudinally aligned front and rear end followers movable lengthwise of the mechanism toward and away from each other; of front and rear outer cushioning elements; an intermediate cushioning element interposed between said end followers; a pair of front and rear intermediate followers, said front intermediate follower being interposed between the front outer cushioning element and the intermediate cushioning element, and said rear intermediate follower being interposed between said rear outer cushioning element and said intermediate cushioning element; and pressure transmitting solid column means between each end follower and the intermediate follower remote therefrom, and having lost motion with respect to one of said last named followers during the first part of the compression stroke of the mechanism to permit compression of all of said cushioning elements between said front and rear end followers, and engageable during the remainder of the compression stroke with said follower with respect to which it has lost motion to effect separation of said intermediate followers to compress said outer cushioning elements in parallel and reduce the pressure on said intermediate element.

6. In a shock absorbing mechanism, the combination with longitudinally aligned front and rear end followers movable lengthwise toward and away from each other; of a pair of front and rear, longitudinally aligned, intermediate followers; cushioning elements interposed between each two adjacent followers; and pressure transmitting solid column means interposed between each end follower and the intermediate follower remote therefrom, each of said column means being normally spaced from one of the followers with which it is associated to provide relative movement between said column means and said last named follower during the first part of the compression stroke of the mechanism, said column means engaging said last named follower during the last part of the compression stroke of the mechanism to actuate said last named follower.

7. In a shock absorbing mechanism, the combination with a pair of front and rear end follower members; of a pair of front and rear intermediate follower members; front and rear cushioning elements interposed between said front end and front intermediate follower members; and said rear end and rear intermediate follower members; an intermediate cushioning element interposed between said intermediate follower members; and solid column means for transmitting pressure direct from said front end follower member to said rear intermediate follower member and from said rear end follower member to said front intermediate follower member, moving said intermediate follower members apart.

8. In a shock absorbing mechanism, the combination with front, rear, and intermediate cushioning elements; of front and rear pressure transmitting members between which said front, rear, and intermediate cushioning elements are interposed, said pressure transmitting members being movable toward and away from each other; and means movable in unison with said front and rear pressure transmitting members, respectively, for compressing said rear cushioning element against said rear pressure transmitting member, and said front cushioning element against said front pressure transmitting member, and unloading said intermediate cushioning element.

9. In a shock absorbing mechanism, the combination with a pair of front and rear cushioning elements; of an intermediate cushioning element between said front and rear elements; front and rear means between which said elements are held under initial compression, said front and rear means being movable toward and away from each other; and means cooperating with said front and rear means for compressing the front and rear elements in parallel and reducing the load on said intermediate element.

10. In a shock absorbing mechanism, the combination with front and rear follower means relatively movable toward and away from each other; of front and rear intermediate followers; a cushioning means interposed between said front follower means and front intermediate follower; a second cushioning means interposed between said rear follower means and said rear intermediate follower; a third cushioning means interposed between said intermediate followers; arms extending rearwardly from said front follower means and engaging said rear intermediate follower; and arms extending forwardly from said rear follower means and engaging said front intermediate follower, said arms moving said intermediate followers apart during movement of said front and rear follower means toward each other to reduce the load on said third named cushioning means and compress said first and second named cushioning means in parallel.

11. In a shock absorbing mechanism, the combination with front and rear follower means relatively movable toward and away from each other; of front and rear intermediate followers; a cushioning means interposed between said front follower means and front intermediate follower; a second cushioning means interposed between said rear follower means and rear intermediate follower; a third cushioning means interposed between said intermediate followers; arms extending rearwardly from said front follower means with the rear ends thereof spaced from said rear intermediate follower; and arms extending forwardly from said rear follower means with the front ends thereof spaced from said front intermediate follower, said first and last named arms being respectively engaged with said rear and front intermediate followers to actuate said intermediate followers to reduce the load on said third named cushioning means and compress said first and second named cushioning means in parallel after the mechanism has been compressed to a predetermined extent.

VERNON S. DANIELSON.

No references cited.